United States Patent [19]

Merianos et al.

[11] Patent Number: 5,152,987

[45] Date of Patent: Oct. 6, 1992

[54] PROCESS FOR PREPARING WATER-INSOLUBLE PVP-IODINE PRODUCT

[75] Inventors: John J. Merianos, Middletown; Paul Garelick, South Plainfield, both of N.J.

[73] Assignee: ISP Investments Inc., Wilmington, Del.

[21] Appl. No.: 773,165

[22] Filed: Oct. 8, 1991

[51] Int. Cl.$^5$ ...................... C08C 19/12; C08F 26/10
[52] U.S. Cl. .............................. 424/78.24; 424/78.25; 424/484; 424/486
[58] Field of Search .................. 424/78.24, 78.25, 484, 424/486, 667, 672; 514/408; 526/264; 525/356

[56] References Cited

U.S. PATENT DOCUMENTS

| | | | |
|---|---|---|---|
| 2,706,701 | 4/1955 | Beller et al. | 424/78.25 X |
| 4,094,967 | 6/1978 | Gilbert | 424/447 |
| 4,113,857 | 9/1978 | Shetty | 424/78.25 |
| 4,214,059 | 7/1980 | Hofer | 424/78.25 |

Primary Examiner—T. K. Page
Assistant Examiner—Robert H. Harrison
Attorney, Agent, or Firm—Walter Katz; Marilyn J. Maue; Joshua J. Ward

[57] ABSTRACT

A process for preparing a water-insoluble PVP-iodine product which comprises intimately mixing water-insoluble PVP, about 10 to 20% by weight of iodine powder and about 0.05 to 1% by weight of isopropanol, heating the reaction mixture at a mixing temperature of about 30°-60° C. for about 0.5 to 6 hours, and heating the mixture at a reaction temperature of about 75° to 98° C. for about 10-24 hours, thereupon forming a stable, uniform, free-flowing powder having an available iodine content of about 9-13% and an iodide content of about 4-6%.

8 Claims, No Drawings

PROCESS FOR PREPARING WATER-INSOLUBLE PVP-IODINE PRODUCT

BACKGROUND OF THE INVENTION

1. Field of the Invention

This invention relates to water-insoluble polyvinylpyrrolidone (PVP)-iodine, and, more particularly, to a process for preparing such product as a stable, uniform, free-flowing powder.

2. Description of the Prior Art

Grosser, in U.S. Pat. No. 3,136,755, disclosed a process for preparing water-insoluble PVP-iodine complexes by heating water-insoluble PVP and iodine at about 90° C. for 24 hours. The product contains only 8.8% available iodine. However, the product has a very low available iodine content, is quite unstable, and does not provide a uniform, free-flowing powder.

Field et al. in U.S. Pat. No. 3,907,720 described a process for making water-insoluble PVP-iodine complexes crosslinked with a suitable crosslinking agent in the form of porous beads or granules by reacting PVP in the form of porous beads or granules with iodine or a solution of iodine at a temperature ranging from room temperature to about 100° C. or more, over a fairly prolonged period of time, i.e. from about 2 hours to 2 weeks or longer. The process, however, did not afford a stable, uniform, free-flowing powder having a high available iodine content.

Other U.S. Pat. Nos. of interest are 4,402,937; 4,027,083; 4,200,710; 4,320,114; 4,035,049; 2,900,305; and 2,754,245.

SUMMARY OF THE INVENTION

A process for preparing a uniform, free-flowing water-insoluble PVP-iodine product which comprises intimately mixing water-insoluble PVP, about 10 to 20% by weight iodine powders and about 0.05 to 1% by weight of isopropanol, heating the reaction mixture at a mixing temperature of about 30°–60° C. for about 0.5 to 6 hours, and heating the mixture at a reaction temperature of about 75° to 98° C. for about 10–24 hours, thereby forming a uniform, free-flowing powder having an available iodine content of about 9–13% and an iodide content of about 4–6%.

DETAILED DESCRIPTION OF THE INVENTION

In accordance with the present invention, the water-insoluble PVP starting material is available from International Specialty Products Inc. (ISP) as the product known as Polyplasdone ®.

The process of the invention involves preparing reaction powders by intimately mixing Crospovidone, about 10 to 20% by wt. of iodine and about 0.5 to 1% by wt. of isopropanol, heating at a mixing temperature of about 30°–60° C. for about 0.5–6 hours, and then heating the mixture at a reaction temperature of about 75°–98° C. for about 10–24 hours, to form a uniform, free-flowing powder having an available iodine content of about 9–13% and an iodide content of about 4–6%.

Representative reaction mixtures, process conditions and properties of the reaction product obtained by such process are shown in the TABLE below.

TABLE

| | Suitable | Preferred | Optimum |
|---|---|---|---|
| Reaction Mixture and Process Conditions | | | |
| PVP* | 80–90 | 81–85 | 83 |
| $I_2$ (% by wt.) | 10–20 | 15–19 | 17 |
| Isopropanol (% by wt.) | 0.05–1 | 0.1–0.5 | 0.2 |
| Mixing temp. (°C.) | 30–60 | 35–55 | 45 |
| Mixing time (hrs.) | 0.5–6 | 1–5 | 3 |
| Reaction temp (°C.) | 75–98 | 85–95 | 90 |
| Reaction period (hrs.) | 10–24 | 12–20 | 16 |
| Reaction Product | | | |
| Avail. $I_2$ (% by wt.) | 9–13 | 10–12 | 11 |
| Iodide (% by wt.) | 4–6 | 4.5–5.5 | 5 |
| Moisture content (% by wt.) | 1–5 | 1.5–3.5 | 2 |

The invention will now be illustrated by the following example.
*Polyplasdone ® (ISP)

EXAMPLE 50 g. of Polyplasdone ® (ISP) 10 g. of iodine (Japan crushed, 99.5%), and 0.12 g. isopropanol are charged into a pint-wide mouth glass jar with a Teflon-lined lid, and having a Teflon plate and wall indentations for effective baffling. The charged jars were placed in a forced air oven equipped with a motor driven rotary cage to allow rotation of the jars at 40 rpm. The reaction mixture in the jars were hand mixed for about ½ minute to disperse the iodine therein, and then the isopropanol was added dropwise, mixed again for ½ minute, rotated in the oven at 45° C. for 3 hours, and then heated at 90° C. for 16 hours. A yellow-brown, free-flowing powder was obtained. The available iodine content of the product was 12.15%; the iodide content was 4.45%; and the moisture content was 2.37%. The product lost was less than 10% iodine after heating at 75° C. for 6 hours.

While the invention has been described with particular reference to certain embodiments thereof, it will be understood that changes and modifications may be made which are within the skill of the art. Accordingly, it is intended to be bound only by the following claims, in which:

What is claimed is:

1. A method for preparing a water-insoluble PVP-iodine product which comprises intimately mixing about 80 to about 90% by wt. of water-insoluble PVP, about 10 to about 20% by wt. iodine powders, and about 0.05 to about 1% by wt. of isopropanol, heating the reaction mixture at a mixture temperature of about 30 to about 60° C. for about 0.5 to 6 hours, and then heating the mixture at a reaction temperature of about 75 to about 98° C. for about 10 to about 24 hours, thereby forming a stable, uniform, free-flowing powder having an available iodine content of about 9 to about 13% and an iodide content of about 4 to about 6%.

2. A process according to claim 1 wherein iodine is charged in an amount of about 15–19% by wt.

3. A process according to claim 1 wherein isopropanol is charged in an amount of about 0.1–0.5% by wt.

4. A process according to claim 1 wherein said reaction temperature is about 85°–95° C. and the reaction time is about 12–20 hours.

5. A process according to claim 1 wherein the product has an available iodine content of about 10 to 12% and an iodide content of about 4.5 to 5.5%.

6. A process according to claim 1 wherein the mixing temperature is about 35°-55° C. and the mixing time is about 1-5 hours.

7. A process according to claim 1 wherein the moisture content of the product is about 1-5% by wt.

8. A process according to claim 1 wherein the iodine charge is 17% by wt., the isopropanol is about 0.2% by wt., the mixing temperature is about 45° C., the mixing time is about 3 hours, the reaction temperature is about 90° C., the reaction time is about 16 hours, and wherein the reaction product has about 11% by wt. available iodine, about 5% by wt. iodide and it also includes about 2% by wt. of moisture.

* * * * *